Jan. 11, 1927.　　　G. W. MacKENZIE　　　1,613,711
LIQUID DISPENSING APPARATUS
Filed Jan. 20, 1923　　　4 Sheets-Sheet 1
FIG.I.
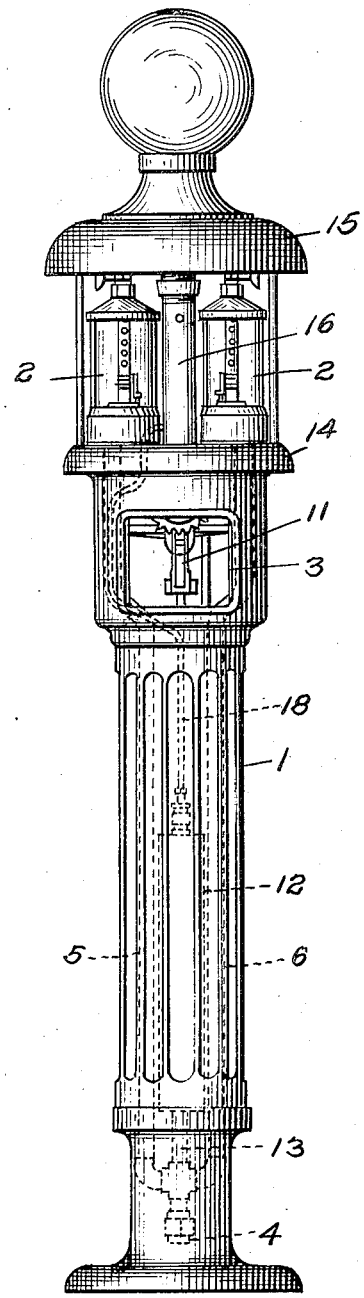
FIG.II.
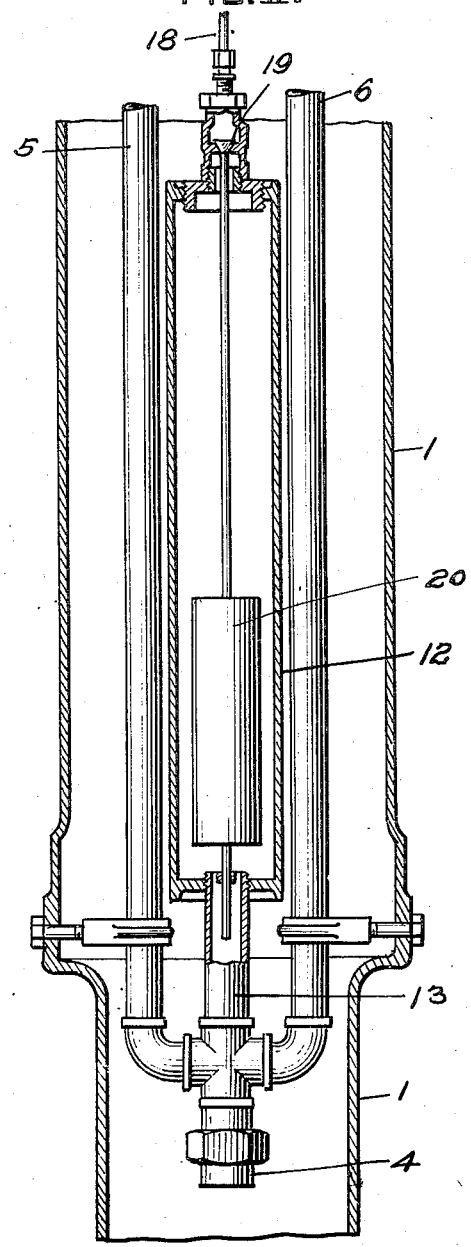
WITNESSES
J. Herbert Bradley.
Percy A. English.
INVENTOR
George W. MacKenzie
by Christy and Christy
his attorneys

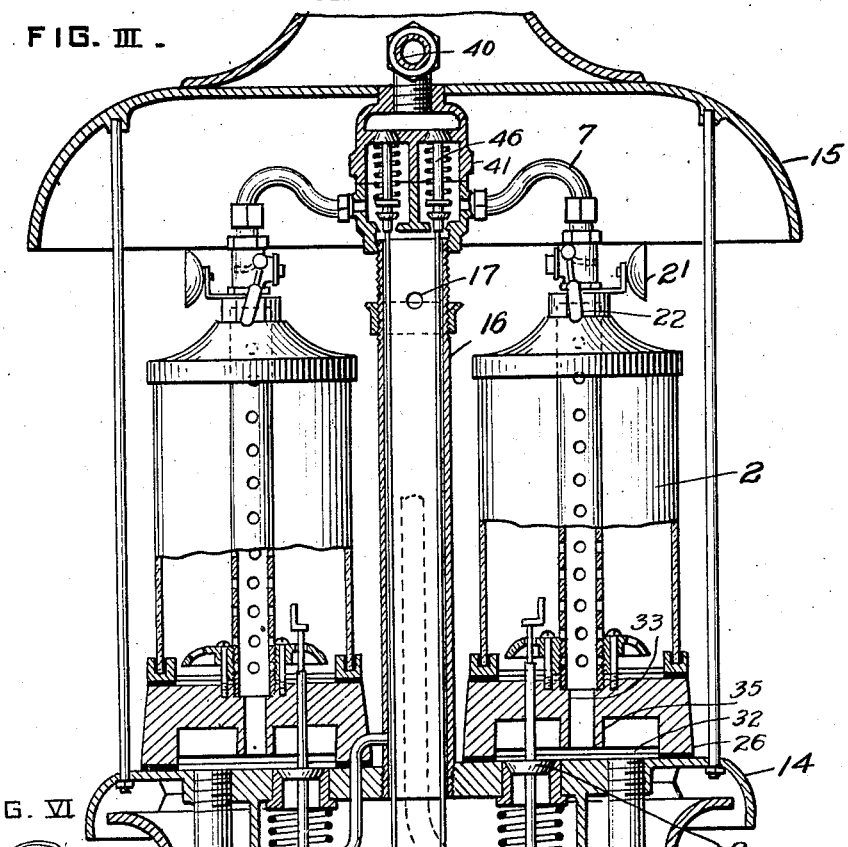
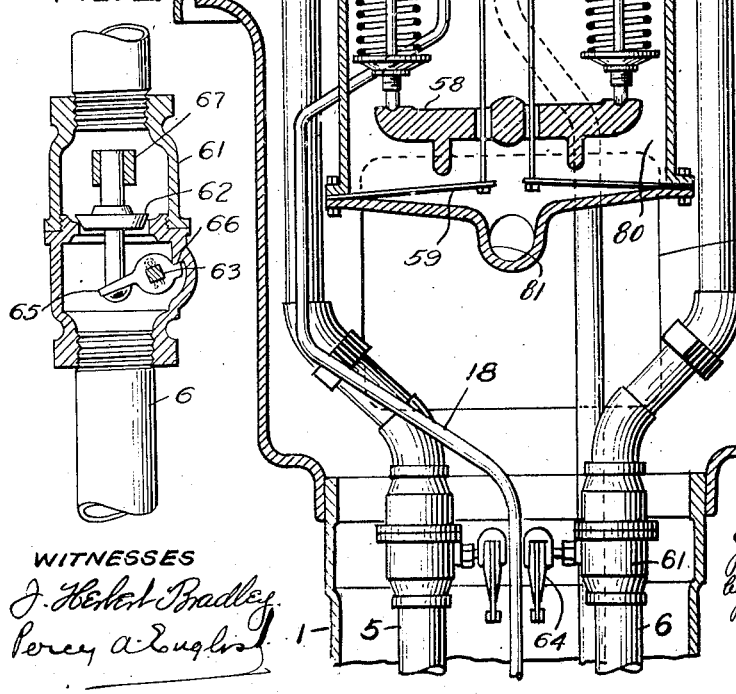
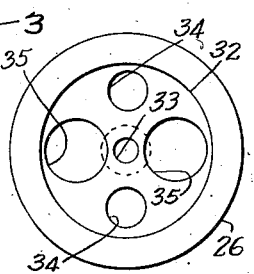

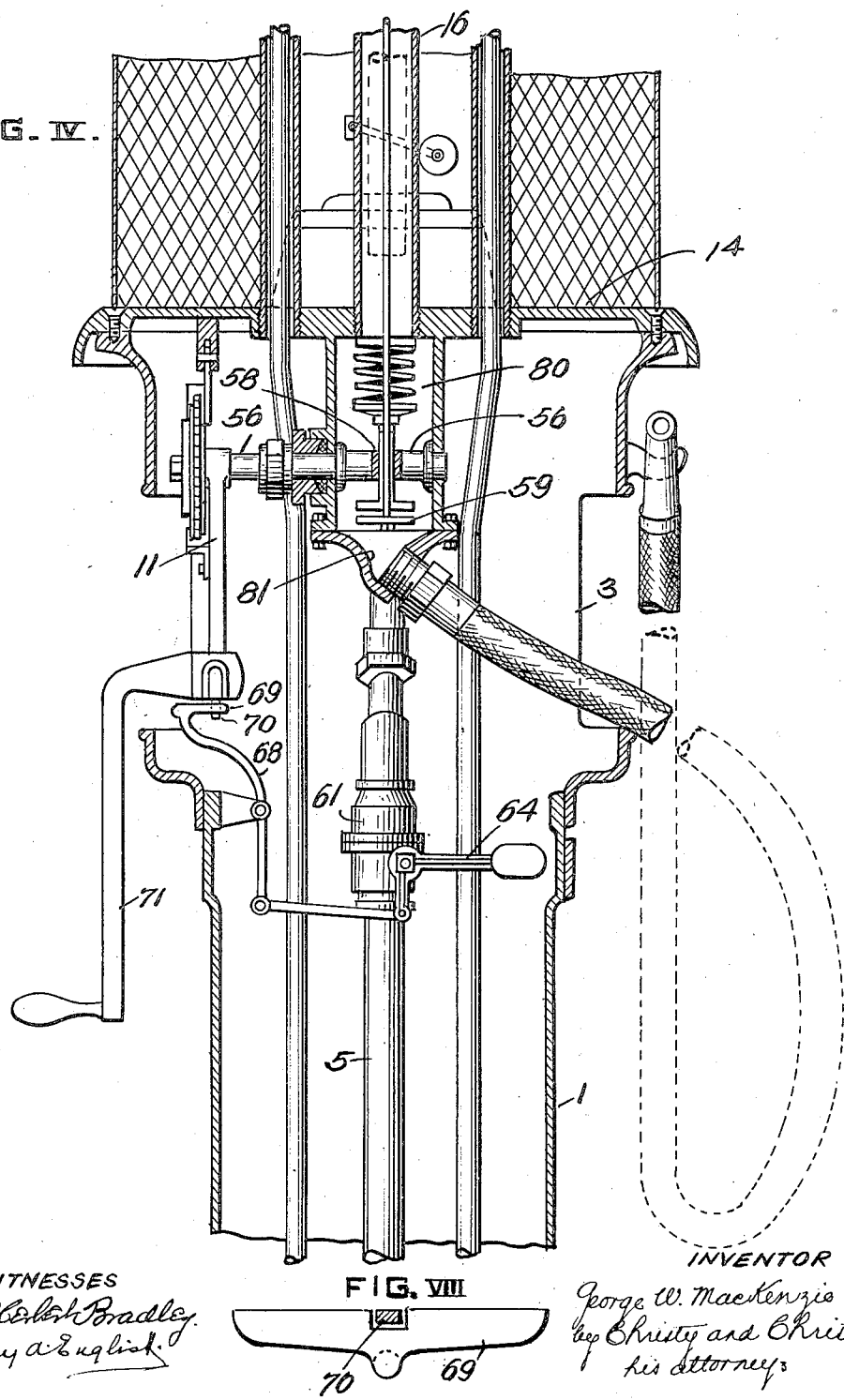

Jan. 11, 1927.
G. W. MacKENZIE
1,613,711
LIQUID DISPENSING APPARATUS
Filed Jan. 20, 1923
4 Sheets-Sheet 4
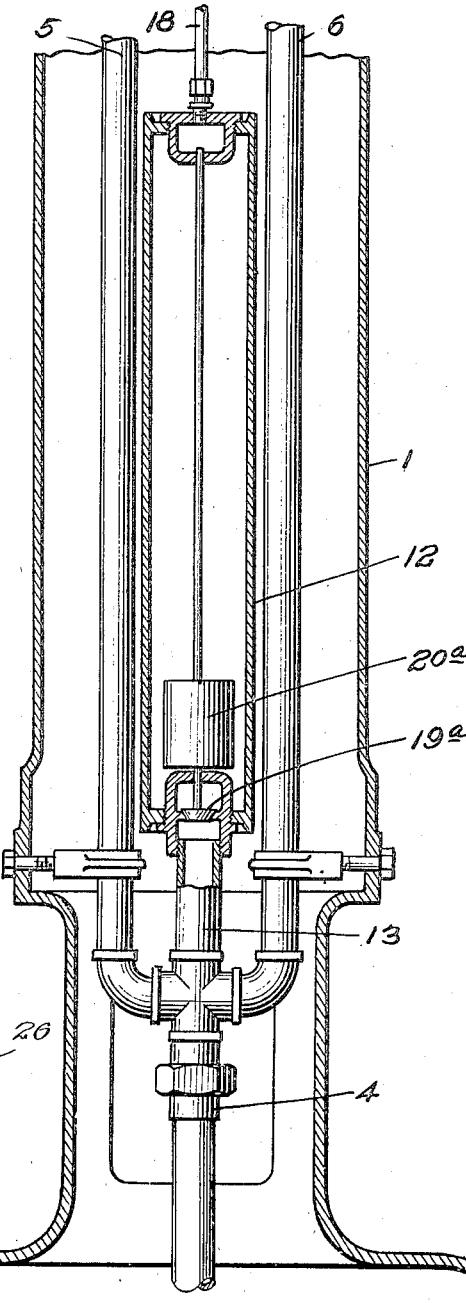
FIG. IX
FIG. VII.
WITNESSES
INVENTOR
George W. MacKenzie
by Christy and Christy
his attorneys
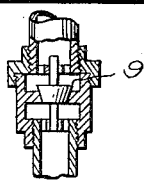

Patented Jan. 11, 1927.

1,613,711

UNITED STATES PATENT OFFICE.

GEORGE W. MacKENZIE, OF BEAVER, PENNSYLVANIA.

LIQUID-DISPENSING APPARATUS.

Application filed January 20, 1923. Serial No. 613,875.

My invention relates to improvements in gasoline-dispensing apparatus. In Letters Patent of the United States now granted me, No. 1,536,402, granted May 5, 1925, and No. 1,568,518, granted January 5, 1926, I have described and claimed apparatus of the nature indicated, including a fixture adapted to be set by the curbstone of a roadway or at other suitable place.

My present invention concerns such a fixture. The fixture having been set in place, as for example by the curbstone of a street, connection is made to a supply tank, and suction apparatus is provided. By the swinging of an operating handle, gasoline (or other liquid) may be drawn by suction from the supply tank into the fixture and having been drawn may be delivered again from the fixture by gravity in measured quantities to customers. My present invention consists in the provision of an additional structural feature, applicable to a fixture having the characteristics indicated, and adapting it to wider service.

The fixture of my present invention, like the fixtures of my now granted patents alluded to, includes glass-walled measuring chambers,—a very desirable feature. But fixtures having glass-walled measuring chambers must, in many States, meet the legal requirement, that their measuring chambers may not, after service, be allowed to stand filled with gasoline.

It is not infrequently desirable to install a new fixture in place of an old one, and that without otherwise disturbing the original installation. Fixtures of certain types require that a non-return valve, commonly called a "foot-valve", be present in the line of communication between supply tank and dispensing fixture. The supply tank may be remotely situated, and both it and the foot-valve, when present, may be underground.

The fixture of my present invention, possessing the supplementary structural feature to which I have made allusion, is applicable in replacement of another fixture, and, even though the installation include a foot-valve, it is not necessary to remove that valve (thus expensive excavation is avoided), and, even though the foot-valve be present, still it is possible to empty the glass-walled measuring chambers and keep them empty after service, and so to comply with such legal requirements of the nature indicated as may be in force.

In the accompanying drawings Fig. I is a view in elevation of the entire fixture, embodying my present invention; Fig. II is a view to larger scale and in vertical section of the lower part of the fixture; Fig. III is a similar showing of the upper part of the fixture; Fig. IV is a fragmentary view in vertical section, and on a plane at right angles to that of Fig. III, showing the medial part of the fixture; Fig. V is a view in plan from beneath of a detail of structure; Fig. VI is a view in vertical section illustrating another detail; Fig. VII is a view in medial and vertical section of that detail which is shown in Fig. V; Fig. VIII is a view in detail, illustrating the inter-engagement of certain parts; Fig. IX is a view corresponding to Fig. II, and illustrating a modification.

The fixture is adapted to stand at the curbstone of a roadway or other suitable place. It consists of a standard 1, carrying glass-walled measuring chambers 2—in this case two in number. The number is immaterial. The standard is further provided, at a lower level than the measuring chambers, with an opening 3, through which a delivery hose may alternately be extended and retired. A gasoline supply pipe 4 from a supply tank divides into branches 5 and 6 and leads to the two measuring chambers, 2, 2, and enters the measuring chambers at the bottom (Fig. III). In this gasoline supply pipe 4 a non-return valve, commonly called a foot valve, may be placed. This is indicated at 9, Fig. IX.

From the measuring chambers 2, at the top, suction pipes 7 lead; these extend to a valve chest 41. Valves 8 control ports opening from the measuring chambers at the bottom to a delivery chamber 80, and from this delivery chamber there is escape by gravity through an orifice 81, to which a delivery hose may be connected. As has been said, such delivery hose may be extended and retired through the opening 3 in the pedestal.

Comparing Figs. III, V, and VII, it will be perceived that the pedestal 26 which forms the base of the measuring chamber is itself chambered; that in the underside of this pedestal is formed a shallow circular recess 32 of relatively large diameter, into which the supply pipe 5 (6) leads and from which the valve-controlled discharge port opens; that upward extending bores 35 which do not penetrate through the pedestal, are aligned above the inlet and discharge ports; and that bores 33 and 34 which do penetrate are provided, to allow the gasoline to pass from the recess 32 into the measuring chamber. This chambered pedestal is provided, to insure a smooth rise of the tide of gasoline within the measuring chamber when a stream of gasoline is sucked through the supply pipe 5 (6).

The valve-chest 41 is divided internally by upper and lower horizontal partitions into three chambers, and the medial chamber of the three is subdivided by a medial vertical partition into right and left chambers. The upper chamber communicates through a pipe 40 with suitable suction apparatus; the lower chamber communicates through a vent 17 with the open air, while the two medial chambers communicate through pipes 7 with the measuring chambers. In the horizontal partitions mentioned, within the valve chest 41, are pairs of ports, the two ports in the upper partition standing opposite the two ports in the lower partition, and double valves 46 are arranged to move vertically each to close alternately one or the other of these opposite ports, while leaving the other open. Springs are provided which tend to hold these valves to their seats in the upper partition, the position in which suction is cut off and the measuring chamber is vented to the air.

A beam 58 is carried on a rotatable shaft 56 and extends normally in the horiztotal position shown in Fig. III. The shaft is manually rotated at the will of the operator through a fraction of a turn, first in one direction and then in the other, by means of a crank 11 extending from the shaft (cf. Figs. I and IV). The beam in its swing engages on one side the stem of valve 8 and opens valve 8 against spring tension, on the other side it engages a flexible band 59, and by engagement depresses it and shifts the valve 46, with the stem of which the band makes engagement. By the swinging of the crank arm 11, co-ordinated shifting of the valve 46 on one side, and of the valve 8 on the other is effected, to the end that, as the crank arm 11 is swung one way or the other, one of two measuring chambers, closed to the air, is brought into communication with the suction apparatus, while the companion chamber is vented to the air and its discharge valve 8 is unseated. While gasoline is being sucked through the pipe 4 into one of the measuring chambers 2, the other chamber, vented to the air, is delivering by gravity its previously indrawn and segregated unit of volume, through chamber 80 to orifice 81 and the connecting delivery hose to the customer. When the controlling lever 11 is in intermediate or neutral position, both measuring chambers are vented above to the air, while the delivery orifices in the chamber bottoms are both closed by the spring-seated valves 8 provided therefor.

In each of the branches 5 and 6 of the supply pipe a valve chest 61 is introduced. This valve chest is shown in vertical section and on large scale in Fig. VI. Within this chest is a valve 62 which, when free of associated instrumentalities about to be described, acts as a downwardly seating check valve. Through the valve chest and journalled in its walls extends a rotatable shaft 63. Externally, this shaft carries a weighted bell-crank lever 64; internally, it carries a crank arm 65, adapted, as the shaft turns, to engage the stem of valve 62, and through such engagement to unseat the valve (as the shaft turns clockwise, Fig. VI). Shaft turning is limited in one direction by a shoulder 66, upon which an arm from the shaft abuts, and in opposite direction by a stop 67, against which the rising valve abuts. Normally, the weighted lever holds the valve unseated and in abutment upon stop 67.

Within pedestal 1 a lever 68 is pivoted (Fig. IV), and this lever is linked to the two weighted bell-crank levers 64. The parts as they are shown in Fig. IV are in neutral position. In that position the weighted bell-crank levers 64 are effective to hold the valves 62 in raised and ineffective position. The upper end of lever 68 extends adjacent to crank 11 and it is there prolonged transversely in the form of a plate 69 (cf. Figs. IV and VIII). Crank 11 is provided with a downwardly extending pin 70 which throughout the range of swing of the crank is engaged by the adjacent vertical rim of this plate 69. The engaging rim of plate 69 is so shaped, that in all positions of the crank but neutral, the crank holds lever 68 swung aside (counter-clockwise, Fig. IV), and when the parts are in this position, the valves 62 are free to act as check valves; but when the crank 11 is in neutral position, the weighted bell-crank levers 64 are allowed to turn under gravity and to shift the valves 62 to their open and ineffective positions. The shape of this plate 69 is shown in plan view in Fig. VIII, and from this figure it will be apparent how, when pin 70 is opposite the notch in the edge of plate 69, as is the case when the crank 11 is standing in neutral position, lever 68 can swing (clockwise, Fig. IV), in response to gravity acting upon weighted bell-crank levers 64. When, however, the apparatus after standing idle is about to be brought into service again, and when the lever 68 has been manually swung counter-clockwise (Fig. IV) and then crank 11 has been turned from neutral position, engagement of the rim of plate 69 with pin 70 will hold the bell-crank levers 64 raised against gravity. And, as has been explained, so long as the bell-crank levers 64 are so raised, valves 62 are free to act as check valves.

When the apparatus is about to be used, the attendant, before he swings crank 11, first draws outwardly the upper end of lever 68. That is to say, he turns lever 68 counter-clockwise as seen in Fig. IV, and in so doing he turns bell-crank levers 64 against gravity, until their further turning is checked by abutment upon shoulders 66. Then, while still holding the end of lever 68, the attendant swings the crank 11 from its neutral position. He may then release his hold upon the lever 68 and the weighted levers 64 will then continue to be sustained in their retracted positions (allowing check valves 62 to function), until the crank 11 comes to neutral position again. When the apparatus is to be put out of use, as when the station is to be closed, the attendant swings crank 11 back to neutral, and thereupon pin 70 comes opposite the notch in plate 69, and the weighted bell-crank levers 64 throw both valves 62 to open and inactive position.

As particularly shown in Fig. IV, it is convenient to form the crank arm 11 with a removable extension 71. This extension 71 will, when the fixture is to be left idle, be removed. This is a convenient matter of precaution, to guard against mischievous tampering with the apparatus.

I provide and mount within the standard so that it stands beneath the level of the bottom of the measuring chamber 2, a storage chamber 12. I make bottom communication from this storage chamber 12 through a conduit 13 with supply pipe 4, and I make top connection from this chamber 12 with the open air, but this at a sufficiently elevated point. In the fixture as here minutely illustrated, the measuring chambers 2 are carried on a platform 14 and these measuring chambers are overhung by a protecting canopy or hood 15. Beneath the hood the valve chest 41 is carried on a hollow post 16, and through this hollow post the prolonged stems of valves 46 conveniently extend. The post itself is ported to the atmosphere as indicated at 17. I conveniently vent the auxiliary chamber 12, by means of a lead 18 through this post 16.

Associated with the storage chamber 12 I provide a float-controlled downwardly-closing valve 19 (19ª) having this particular characteristic, that when the chamber 12 previously filled is being emptied by suction into one of the measuring chambers, this valve will, as emptying is completed, close. When the valve is closed the line of suction is cut off. The valve once closed will remain closed until the gasoline, descending by gravity from one of the measuring chambers, rises again in chamber 12.

As shown in Fig. II, the valve 19 is arranged above, at the point where chamber 12 opens into duct 18. The float 20 is secured to the stem of the valve. As shown in Fig. IX, valve 19ª is arranged below, at the point where pipe lead 13 opens into chamber 12. The float 20ª is secured to the valve stem as in the other case. It will be observed that the structure is such that the float is limited in its range of rise and fall, and that as the tide of gasoline rises within the chamber 12, the float necessarily is submerged. The material of which the float is formed will be such as to endure the conditions of service. Conveniently it may be of cork covered or treated in such manner as to render it impenetrable to gasoline.

In the operation of the apparatus as a whole, as crank arm 11 is swung from one to the other of its extreme positions right and left (Figs. I and III), first one measuring chamber and then the other is by suction filled with gasoline drawn primarily from the supply tank through pipe 4 and one or the other of its branches 5 and 6. When one measuring chamber is so being filled, the other is emptying by gravity through the port in the chamber bottom which is controlled by valve 8, into chamber 80, and thence through the delivery hose. When, sequent upon such swinging, crank arm 11 is returned to and allowed to remain in its neutral position, suction ceases. Both measuring chambers are then in the condition of being vented to the atmosphere, but closed against delivery. When the crank arm 11 has so been returned to neutral position and allowed to remain there, lever 68 being unrestrained, the weighted bell-crank levers 64 will swing, the lever 68 will be brought to the relative position indicated in Fig. VIII, the two valves 62 in the two lines 5 and 6 will be lifted from their seats and rendered ineffective. The charge of gasoline which on the last preceding swing of the crank arm 11 had been drawn into one of the measuring chambers will now return by gravity through its branch 5 (6) of the supply pipe. In case the installation includes a non-return or foot valve 9 (Fig. IX), the so returning charge of gasoline will have free access to the storage chamber 12 and will find temporary accommodation there, leaving the glass-walled measuring chamber empty, as law may require.

When in the further course of operation, the storage chamber 12 being full, the attendant swings lever 68 and crank arm 11, a condition of suction is established in one of the measuring chambers. This suction is effective, first, to draw from the storage chamber 12 the body of liquid which it contains. It is effective to this end because the chamber 12 is vented to the air. As the chamber 12 is by suction being emptied into one of the measuring chambers, the valve 19 will, as emptying is completed, close. When valve 19 closes the line of suction is cut off and further suction will then be effective to draw gasoline from the source of supply through pipe 4. The valve 19 so closed will remain closed until gasoline, descending by gravity from one of the measuring chambers, rises again in chamber 12.

Chamber 12 will have capacity sufficient to allow a previously filled measuring chamber to empty completely.

Gasoline so withdrawn from the measuring chamber into chamber 12 may be retained there indefinitely, without infraction of laws of the nature indicated.

It will be perceived that by the provision of this storage chamber, positioned and functioning as I have described, my fixture becomes applicable universally, and may, without otherwise disturbing the installation, replace other fixtures, even though in such previously established installations, the supply tank with its delivery pipe be provided with a "foot-valve", that is to say, a non-return valve.

The storage chamber 12 with its float valve and its vent pipe are removable, and so my fixture is adaptable to such particular conditions as may exist; if the fixture is to be installed in association with a supply tank provided with a foot-valve, the storage chamber will be employed; if no such check valve be present in the installation the storage chamber may be removed and the connections capped.

Tell-tale bells 21 may be provided, associated with the receiving chambers, and these bells may be struck with clappers 22 swung by floats, so that the bell will ring as the chamber fills.

I have throughout characterized the apparatus which I have been describing as gasoline-dispensing apparatus. Manifestly it is accidental that the apparatus comes to be practically useful in the dispensing of gasoline; manifestly it is useful in the dispensing of liquid generally, and my patent will be construed accordingly.

I claim as my invention:

1. In combination, a liquid receiving chamber vented to the air, a container located above said chamber, a conduit connecting the bottoms of the chamber and of the container, a float valve arranged in said chamber, a downwardly closing check valve in the said conduit, means for throwing the said check valve out of service at will, leaving the conduit open at that point, means for connecting a non-return source of supply to said conduit intermediate said valve and said chamber.

2. In liquid-dispensing apparatus the combination of an elevated measuring chamber, a supply pipe opening to said measuring chamber at the floor level thereof, a foot valve in said supply pipe, a storage tank arranged between the level of the foot valve in the supply pipe and the level of the floor of the measuring chamber, a branch pipe connecting said storage tank with said supply pipe, a check valve arranged in said supply pipe at a point intermediate the point of connection of the said branch pipe and the point of opening to the measuring chamber, means for throwing such check valve out of service at will, leaving the pipe open at that point, means for alternately establishing a condition of suction in said measuring chamber and venting said chamber to the air, and means rendered ineffective by the presence of liquid in the storage tank for interrupting suction through said storage tank.

In testimony whereof I have hereunto set my hand.

GEORGE W. MACKENZIE.